(12) United States Patent
Haf et al.

(10) Patent No.: US 11,518,211 B2
(45) Date of Patent: Dec. 6, 2022

(54) AIR TREATMENT APPARATUS

(71) Applicant: AGCO International GmbH, Neuhausen (CH)

(72) Inventors: Dietmar Haf, Marktoberdorf (DE); Alexander Zeller, Fussen (DE); Michael Krösser, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 274 days.

(21) Appl. No.: 16/955,748

(22) PCT Filed: Nov. 23, 2018

(86) PCT No.: PCT/EP2018/082376
§ 371 (c)(1),
(2) Date: Jun. 18, 2020

(87) PCT Pub. No.: WO2019/120880
PCT Pub. Date: Jun. 27, 2019

(65) Prior Publication Data
US 2021/0078378 A1  Mar. 18, 2021

(30) Foreign Application Priority Data
Dec. 20, 2017 (GB) ..................................... 1721500

(51) Int. Cl.
*B01D 46/70* (2022.01)
*B60H 1/00* (2006.01)
*B60H 3/06* (2006.01)

(52) U.S. Cl.
CPC ....... *B60H 1/00378* (2013.01); *B60H 3/0625* (2013.01); *B60H 3/0633* (2013.01); *B60H 2001/00099* (2013.01)

(58) Field of Classification Search
CPC .............. B01H 1/00378; B60H 3/0625; B60H 3/0633; B60H 2001/00099;
(Continued)

(56) References Cited

U.S. PATENT DOCUMENTS

2016/0367928 A1\* 12/2016 Leconte ............... B01D 46/444

FOREIGN PATENT DOCUMENTS

DE     2950179 A1 \* 12/1979
DE     3545664 A1 \* 12/1985
(Continued)

OTHER PUBLICATIONS

UK Intellectual Property Office, Search Report for priority Application No. GB1721500.5, dated Jun. 12, 2018.
(Continued)

*Primary Examiner* — Edelmira Bosques
*Assistant Examiner* — Emily Marie Kopp

(57) ABSTRACT

An air filtration system for an operator environment of an agricultural vehicle including at least one external inlet, a first filtration device having a coarser level of filtration located between the external inlet and an HVAC system, a second filtration device having a second finer level of filtration and an associated blower located between the external inlet and the HVAC system where the air filtration system selectively connects either the first filtration device to the HVAC system blower or the second filtration device and its associated blower to the HVAC system blower and a bypass permanently connects the HVAC system blower and the second filtration device.

20 Claims, 3 Drawing Sheets

(58) Field of Classification Search
CPC ............ B60H 2001/00092; B60H 3/06; B60H 3/0608; B01D 46/70; B01D 46/90; B01D 2273/30
USPC ....... 454/158, 156, 139; 296/190.09; 96/127
See application file for complete search history.

(56) References Cited

FOREIGN PATENT DOCUMENTS

| | | | | |
|---|---|---|---|---|
| DE | 3545664 | A1 | 7/1987 | |
| DE | 10 2012 203625 | A1 | 9/2013 | |
| DE | 10 2013 102872 | A1 | 9/2014 | |
| DE | 102013102872 | A1 * | 9/2014 | ......... B60H 1/00471 |
| DE | 102014225272 | A1 * | 7/2015 | ......... B60H 1/00771 |
| EP | 2805840 | A1 * | 11/2014 | ......... B60H 1/00378 |
| EP | 3109077 | A1 | 12/2016 | |
| FR | 2848500 | A1 * | 6/2004 | ........... B60H 3/0633 |
| FR | 3 050 145 | A1 | 10/2017 | |
| FR | 3050145 | A1 * | 10/2017 | |
| WO | WO-2010121656 | A1 * | 10/2010 | ......... B01D 46/0067 |
| WO | WO-2015159248 | A1 * | 10/2015 | ......... B60H 1/00378 |
| WO | 2016/005401 | A1 | 1/2016 | |
| WO | WO-2016005401 | A1 * | 1/2016 | ......... B60H 1/00378 |
| WO | WO-2018083348 | A1 * | 5/2018 | ......... B01D 46/0086 |

OTHER PUBLICATIONS

European Patent Office, International Search Report for related International Application No. PCT/EP2018/082376, dated Feb. 18, 2019.

* cited by examiner

AIR TREATMENT APPARATUS

FIELD OF THE INVENTION

The present invention relates to an air treatment apparatus, in particular for an air treatment apparatus for an operator environment or cab of an agricultural vehicle or a similar vehicle.

BACKGROUND

Agricultural vehicles are known to operate in environments in which many different kinds of particulate or contaminant are present. This creates a requirement for filtration of the air for operators of such vehicles when in use. The particulates may be of different sizes and of different natures, for example larger particulates such as dust, pollen and the like and smaller contaminants such as fumes, aerosols and vapours.

It is known to provide separate air filters to provide selective filtering of the air supply to a vehicle operator. For example a first filter may be used when the predominant contaminant in the working environment of the agricultural vehicle is relatively large (for example when traversing a field) and a second filter is used when the predominant contaminant in the working environment is relatively small (for example when applying a herbicide, pesticide or similar).

Also, legislation in various countries now requires the use of filters of a particular rating to filter out particular contaminants from the air introduced into the operator environment or cabin of the agricultural vehicle. For example in the EU, EU Standard EN 15695 provides for four categories of filter for cabin protection, where Category 2 protects only against dust but does not protect against aerosols and vapours, Category 3 protects against dust and aerosol, but not vapours and Category 4 protects against dust, aerosols and vapours. In this context, Category 3 filters tend to be more expensive than Category 2 filters, with Category 4 being most expensive. Accordingly, it is beneficial to the working life of the higher rated filters if they can be cleaned rather than replaced. It is a further advantage if such filters can be cleaned when in service on the agricultural vehicle rather than being removed while being cleaned (requiring replacement during cleaning or enforced downtime of the agricultural vehicle).

SUMMARY OF THE INVENTION

According to a first aspect of the present invention, an air treatment apparatus for an operator environment of an agricultural vehicle in which air to be filtered is drawn into an air filtration system, filtered and directed to an agricultural vehicle HVAC system, is disclosed in which the HVAC system comprises an inlet plenum, a blower, other HVAC components and an outlet to the operator environment, the air filtration system comprising at least one external inlet, a first filtration device having a first coarser level of filtration located between the external inlet and the HVAC inlet plenum, a second filtration device having a second finer level of filtration located between the external inlet and the HVAC inlet plenum, an air filtration system blower connected to the HVAC inlet plenum, a valve mechanism selectively to connect either the first filtration device to the HVAC inlet plenum or the second filtration device to the inlet HVAC plenum, the air treatment apparatus being characterised in that a bypass is permanently connected at a second end adjacent the second filtration device such that in use a portion of an air flow downstream of the valve mechanism may be recirculated to purge the second filtration device.

Preferably the second end of the bypass is located between the second filtration device and the valve mechanism.

Preferably the valve mechanism selectively connects either the first filtration device to the HVAC inlet plenum or the second filtration device to the HVAC inlet plenum such that in use an air flow is directed from one or the other of the filtration devices to the HVAC inlet plenum.

Preferably the valve mechanism is located between the first filtration device and the second filtration device.

Preferably the first filtration device is adapted to filter dust particles. Preferably the second filtration device is adapted to filter dust, aerosols and vapour.

Preferably the air filtration blower is associated with the second filtration device, a second end of the bypass is located between the air filtration blower and the second filtration device, and a first end of the bypass is located between the HVAC blower and the other HVAC components.

Preferably the valve mechanism is located between the air filtration blower and the HVAC inlet plenum.

Preferably the valve mechanism is located between the first filtration device and the blower associated with the second filtration device.

Preferably a first end of the bypass is located between the HVAC blower and the other HVAC components.

Preferably a first end of the bypass is located between the HVAC blower and the other HVAC components.

More preferably the air filtration blower is located between the valve mechanism and the HVAC inlet plenum.

Alternatively, the air filtration blower is located between the valve mechanism and the HVAC inlet plenum.

Preferably a first end of the bypass is connected to the air filtration blower.

According to a second aspect of the present invention a method of operation of an air filtration apparatus in accordance with the first aspect of the invention is provided for.

This has as an advantage that the air filtered by the first filtration device is used to clean the second filtration device. It can be seen that the second filtration device is being cleaned whenever the first filtration device is in operation. It is a further advantage, with the first filtration device connected to the HVAC system and the blower associated with the second filtration device inactive, that the use of the portion of the treated air to clean the second filtration device results in a gentler cleaning action than if the blower associated with the second filtration device is reversed to drive air back through the second filtration device. This results in a prolonged life for the filter.

According to third aspect of the present invention an agricultural vehicle comprises an operator environment and an air filtration apparatus in accordance with the first aspect of the invention.

BRIEF DESCRIPTION OF THE DRAWINGS

The invention will now be described, by way of example only, in which.

DETAILED DESCRIPTION OF SPECIFIC EMBODIMENTS OF THE INVENTION

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
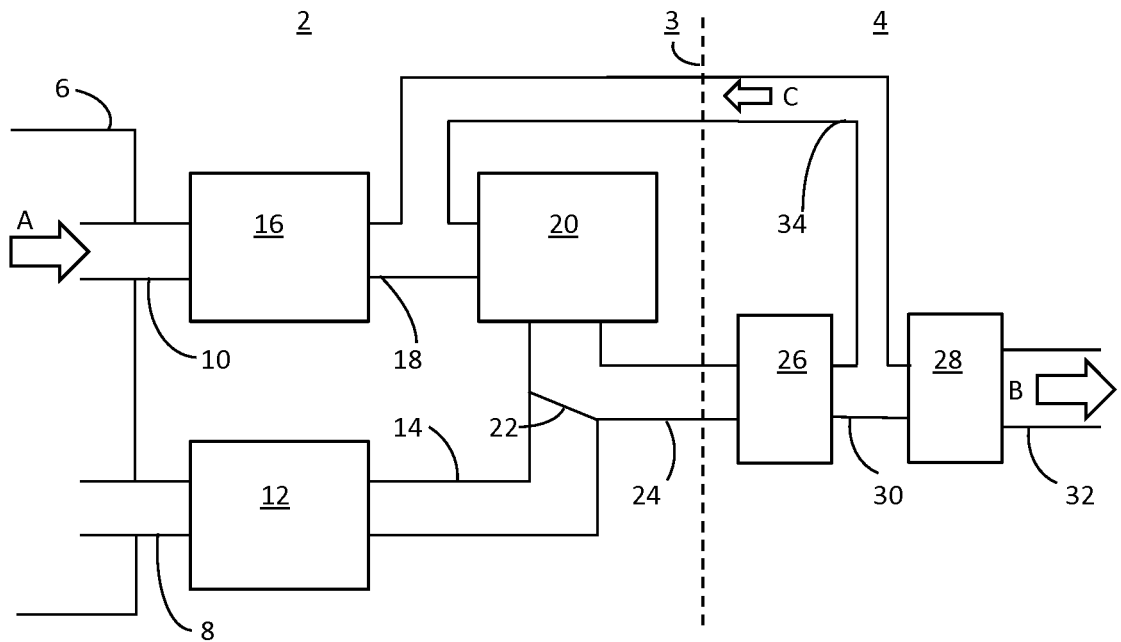
FIG. 1 shows a schematic view of a first embodiment of an air filtration apparatus in accordance with the present invention in a first operating condition.
Figure 2:
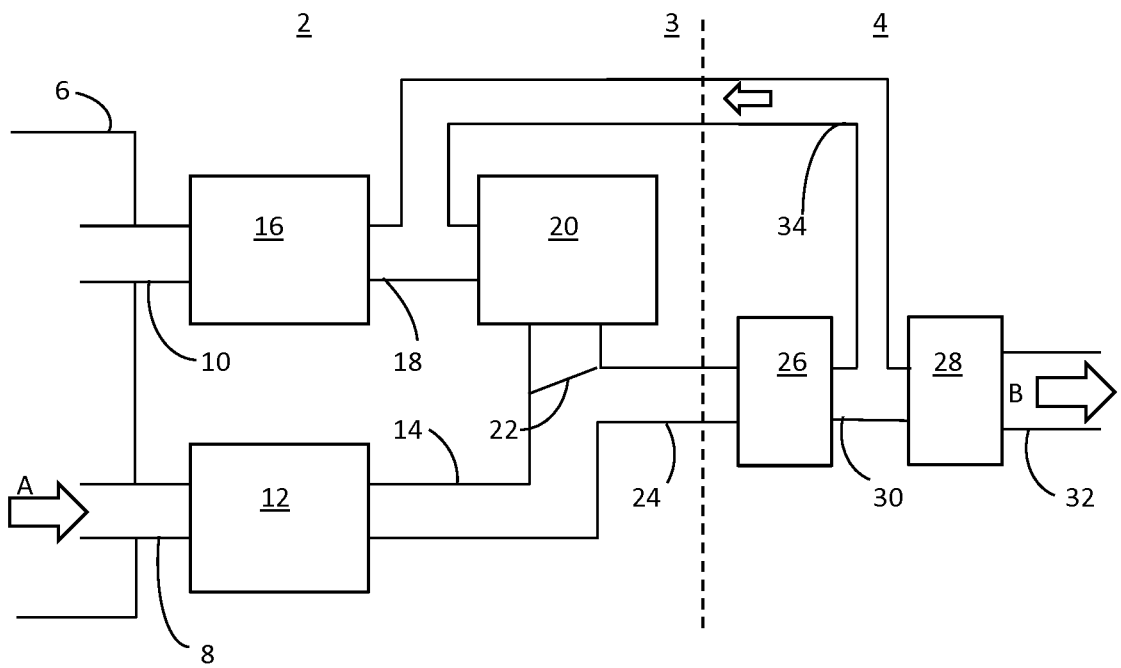
FIG. 2 shows a schematic view of the air filtration apparatus of FIG. 1 in a second operating condition.

With reference to FIGS. 1 and 2, a schematic view of a first embodiment of an air filtration apparatus is shown comprising an air filtration system 2 (to the left of the dashed line 3) connected to an HVAC system 4 (to the right of the dashed line 3) for an operator environment or cabin of an agricultural vehicle.

An external inlet 6 is shown feeding a first vent or duct 8 and a second vent or duct 10 by which air to be filtered is drawn into the filtration system. In an alternative embodiment (not shown) the first and second vents or ducts 8,10 may be provided with individual external inlets. The external inlet 6 may conveniently be located in a roof housing of the cabin of the agricultural vehicle.

The first vent or duct 8 is directed to a first filtration device 12 having a first coarser level of filtration. The first filtration device 12 is conveniently suitable for extracting dust particles and the like from the externally fed air. By way of example, this may be a Category 2 dust filter. The first filtration device 12 is provided with an outlet 14. The outlet 14 is connected to a first inlet side of a valve mechanism 22.

The second vent or duct 10 is directed to a second filtration device 16 having a second finer level of filtration. The second filtration device 16 is conveniently suitable for extracting dust, aerosols, vapour and the like from the externally fed air. By way of example, this may be a Category 4 filter. The second filtration device 16 is provided with an outlet 18. An air filtration system blower 20, conveniently a fresh air blower, is associated with the second filtration device 16. The air filtration system blower 20 is provided with an inlet connected to the outlet 18 of the second filtration device 16 and an outlet connected to a second inlet side of the valve mechanism 22.

The valve mechanism 22 is provided with an outlet conduit 24. The valve mechanism allows air flow from the second filtration device 16 to the outlet conduit 24 while isolating the first filtration device 12 or, alternatively allows air flow from the first filtration device 12 to the outlet conduit 24 while isolating the second filtration device 16.

The valve mechanism 22 may be operated by any convenient means, for example automatically following a suitable signal received from a suitable sensor, automatically following actuation of a suitable device for example a sprayer, or by the direct action of a driver actuating suitable means within the cab.

In FIGS. 1 and 2 the outlet conduit 24 is connected to an inlet plenum of the HVAC system and in particular connects the outlet conduit 24 to a blower 26 of the HVAC system ('HVAC system blower').

The HVAC system typically includes additional components 28 downstream of the blower 26, such as by way of example a evaporator and a heater. The HVAC blower 26 is provided with a connecting conduit 30 to direct the air flow through the other components before delivery to the cabin by way of a cabin air supply duct 32.

A first end of a bypass channel or passage 34 is connected to the connecting conduit 30. A second end of the bypass channel or passage 34 is located between the second filtration device 16 and the associated air filtration system blower 20.

A further air recirculation path is provided by a conduit (not shown) extending between the cabin and the outlet conduit 24.

The typical operating position of the valve mechanism 22 is that shown in FIG. 2. However, when there is a need to extract aerosols, vapour and the like the system is switched to the configuration shown in FIG. 1.

To adopt the configuration shown in FIG. 1, the valve mechanism 22 is moved to the position shown and the air filtration system blower 20 is also actuated. Air is drawn into the air filtration system through the second vent or duct 10 (arrow A) and drawn through the second filtration device 16 to remove dust, aerosols, vapour and the like entrained in the air. The air is directed through the valve mechanism 22 to the outlet conduit 24 and then drawn by the HVAC system blower 26 into the HVAC system and onward to the cabin air supply duct 32 (arrow B). In this position, the valve mechanism 22 prevents communication between the first filtration device 12 and the HVAC blower 26. A first volume of underpressure is formed between the second filtration device 16 and the air filtration system blower 20. Since the HVAC blower 26 is stronger than the air filtration system blower 20, a second volume of underpressure is created between the air filtration system blower 20 and the HVAC blower 26.

Due to an overpressure created in this situation on the HVAC system side, some of the air drawn into the HVAC system will recirculate through the bypass 34 (arrow C) into the region between the second filtration device 16 and the air filtration system blower 20 to mix with the freshly filtered air from the second filtration device 16 before being drawn by the air filtration system blower 20 toward the HVAC blower.

Once the need to extract aerosols, vapour and the like has passed, the valve mechanism 22 is caused to adopt the position shown in FIG. 2 (the air filtration system blower 20 is also deactivated). In this position, the valve mechanism 22 prevents air flowing from the second filtration device 16 past the air filtration system blower 20 to the inlet plenum of the HVAC blower 26.

Air is drawn into the air filtration system through the first vent or duct 8 (arrow A) and directed through the first filtration device 12 to remove dust and the like entrained in the air. The air passes through the valve mechanism 22 to the outlet conduit 24 and most is then drawn by the HVAC system blower 26 into the HVAC system and out through the cabin air supply duct 32 (arrow B).

In addition, again due to the overpressure a portion of the air drawn into the HVAC system is drawn or recirculated through the bypass channel or passage 34 (arrow C) to the region between the second filtration unit 16 and the air filtration system blower 20, where, due to sealing of the fresh air blower in its inactive state, the recirculated air is directed back through the second filtration device 16, thereby removing trapped dust, vapour and aerosol particles and the like from the second filtration device 16 and directing these back out through vent or duct 10.

This has as an advantage that the air filtered by the first filtration device 12 is used to clean the second filtration device 16. It can be seen that the second filtration device 16 is being cleaned whenever the first filtration device 12 is in operation. It is a further advantage, with the first filtration device 12 connected to the HVAC system and the air filtration system blower 20 associated with the second filtration device 16 inactive, that the use of the portion of the treated air to clean the second filtration device 16 results in a gentler cleaning action than if the air filtration system blower associated with the second filtration device 16 is reversed to drive air back through the second filtration device 16. This results in a prolonged life for the second filtration device 16.

Figure 3:
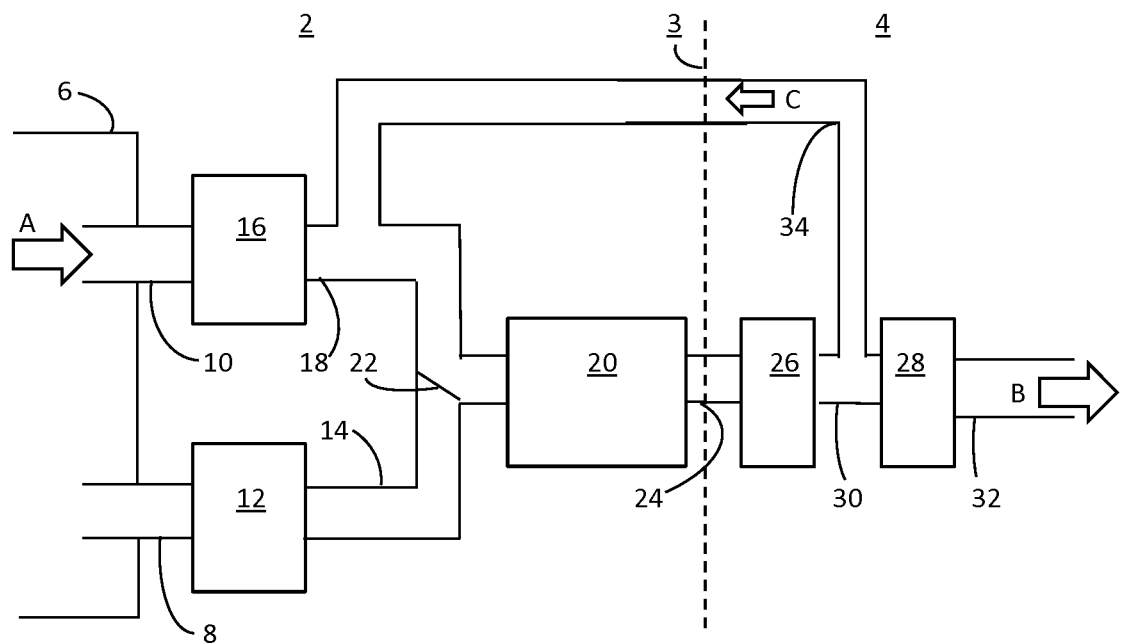
FIG. 3 shows a schematic view of a second embodiment of an air filtration apparatus in accordance with the present invention in a first operating condition.
Figure 4:
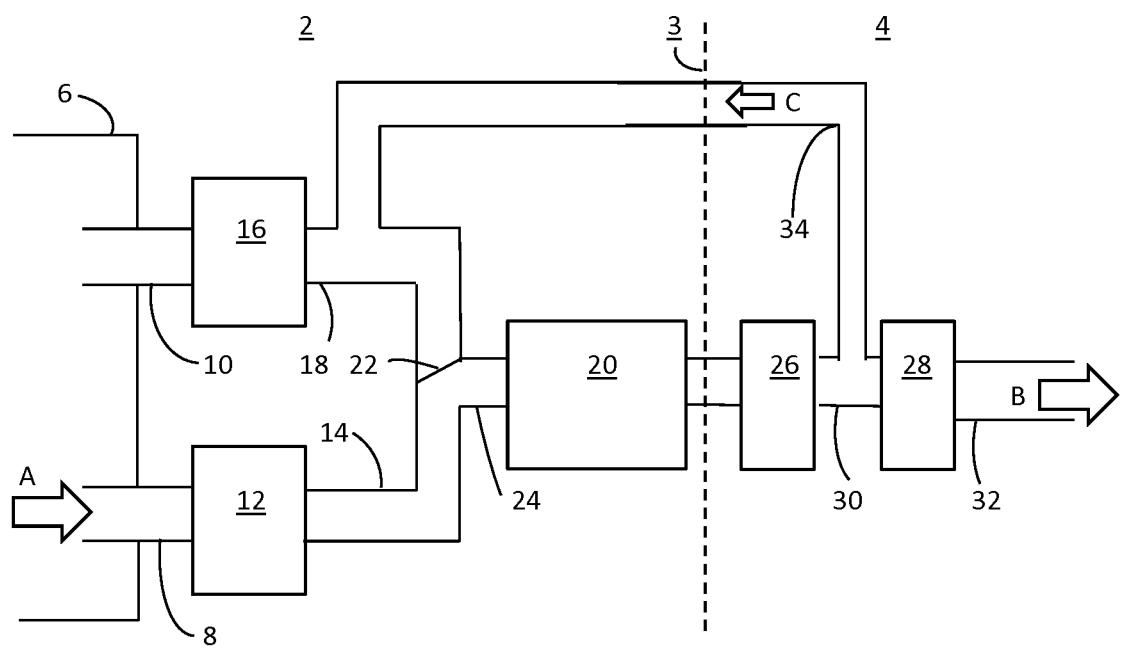
FIG. 4 shows a schematic view of the air filtration apparatus of FIG. 3 in a second operating condition.

A second embodiment of an air treatment apparatus in accordance with the present invention is shown in FIGS. 3 and 4. Like reference numerals are used to refer to like parts. The air treatment apparatus comprises an air filtration system 2 (to the left of the dashed line 3) is shown connected to an HVAC system 4 (to the right of the dashed line 3) for an operator environment or cabin of an agricultural vehicle.

An external inlet 6 is shown feeding a first vent or duct 8 and a second vent or duct 10 by which air to be filtered is drawn into the filtration system. In an alternative embodiment (not shown) the first and second vents or ducts 8,10 may be provided with individual external inlets. The external inlet 6 may conveniently be located in a roof housing of the cabin of the agricultural vehicle.

The first vent or duct 8 is directed to a first filtration device 12 having a first coarser level of filtration. The first filtration device 12 is conveniently suitable for extracting dust particles and the like from the externally fed air. By way of example, this may be a Category 2 dust filter. The first filtration device 12 is provided with an outlet 14. The outlet 14 is connected to a first inlet side of a valve mechanism 22.

The second vent or duct 10 is directed to a second filtration device 16 having a second finer level of filtration. The second filtration device 16 is conveniently suitable for extracting dust, aerosols, vapour and the like from the externally fed air. By way of example, this may be a Category 4 filter. The second filtration device 16 is provided with an outlet 18. The outlet 18 of the second filtration device 16 is connected to second inlet side of the valve mechanism 22.

The valve mechanism 22 is provided with an outlet conduit 24. The outlet conduit 24 is connected to an air filtration system blower, conveniently a fresh air blower 20. IN this embodiment, the fresh air blower is always on while air is being filtered. The valve mechanism allows air flow from the second filtration device 16 to the outlet conduit 24 while isolating the first filtration device 12 or, alternatively allows air flow from the first filtration device 12 to the outlet conduit 24 while isolating the second filtration device 16.

The valve mechanism 22 may be operated by any convenient means, for example automatically following a suitable signal received from a suitable sensor, automatically following actuation of a suitable device for example a sprayer, or by the direct action of a driver actuating suitable means within the cab.

In FIGS. 3 and 4, an outlet of the fresh air blower 20 is connected to an inlet plenum of the HVAC system and in particular connects the outlet to a blower 26 of the HVAC system ('HVAC system blower').

Additional HVAC components 28 such as by way of example a evaporator and a heater are typically provided downstream of the HVAC blower 26. The HVAC blower 26 is provided with a connecting conduit 30 to direct the air flow through the other components before delivery to the cabin by way of a cabin air supply duct 32.

A first end of a bypass channel or passage 34 is connected to the connecting conduit 30. A second end of the bypass channel or passage 34 is located between the second filtration device 16 and the valve mechanism 22.

A further air recirculation path is provided by a conduit (not shown) extending between the cabin and the outlet conduit 24.

The typical operating position of the valve mechanism 22 is that shown in FIG. 4. However, when there is a need to extract aerosols, vapour and the like the system is switched to the position shown in FIG. 3.

To adopt the configuration shown in FIG. 3, the valve mechanism 22 is moved to the position shown. Air is drawn into the air filtration system through the second vent or duct 10 (arrow A) and drawn through the second filtration device 16 to remove dust, aerosols, vapour and the like entrained in the air. The air is then directed through the valve mechanism 22 to the outlet conduit 24 through the fresh air blower 20 and subsequently drawn by the HVAC system blower 26 into the HVAC system and onward to the cabin air supply duct 32 (arrow B). In this position, the valve mechanism 22 prevents air flowing from the first filtration device 12 to the fresh air blower 20 or the HVAC blower 26.

Some of the air drawn into the HVAC system will recirculate through the bypass 34 (arrow C) to the region between the second filtration device 16 and the valve mechanism 22 to mix with the freshly filtered air from the second filtration device 16 before being drawn again by the fresh air blower 20 toward the HVAC blower.

Once the need to extract aerosols, vapour and the like has passed, the valve mechanism 22 is caused to adopt the position shown in FIG. 4. In this position, the valve mechanism 22 prevents air flowing from the second filtration device 16 past the fresh air blower 20 to the inlet plenum of the HVAC blower 26.

Air is drawn into the air filtration system through the first vent or duct 8 (arrow A) and directed through the first filtration device 12 to remove dust and the like entrained in the air. The air passes through the valve mechanism 22 to the outlet conduit 24 through the fresh air blower 20 and then drawn by the HVAC system blower 26 into the HVAC system and out through the cabin air supply duct 32 (arrow B).

Additionally, a portion of the air drawn into the HVAC system is drawn to be recirculated back through the bypass channel or passage 34 (arrow C) to the region between the second filtration unit 16 and the valve mechanism 22, where the recirculated air is directed back through the second filtration device 16, thereby removing trapped dust, vapour and aerosol particles and the like from the second filtration device 16 and directing these back out through vent or duct 10.

A third embodiment of an air treatment apparatus in accordance with the present invention is shown in FIGS. 5 and 6. Like reference numerals are again used to refer to like parts. The air treatment apparatus comprises an air filtration system 2 (to the left of the dashed line 3) connected to an HVAC system 4 (to the right of the dashed line 3) for an operator environment or cabin of an agricultural vehicle.

An external inlet 6 is shown feeding a first vent or duct 8 and a second vent or duct 10 by which air to be filtered is drawn into the filtration system. In an alternative embodiment (not shown) the first and second vents or ducts 8,10 may be provided with individual external inlets. The external inlet 6 may conveniently be located in a roof housing of the cabin of the agricultural vehicle.

The first vent or duct 8 is directed to a first filtration device 12 having a first coarser level of filtration. The first filtration device 12 is conveniently suitable for extracting dust particles and the like from the externally fed air. By way of example, this may be a Category 2 dust filter. The first filtration device 12 is provided with an outlet 14. The outlet 14 is connected to a first inlet side of a valve mechanism 22.

The second vent or duct 10 is directed to a second filtration device 16 having a second finer level of filtration. The second filtration device 16 is conveniently suitable for extracting dust, aerosols, vapour and the like from the externally fed air. By way of example, this may be a Category 4 filter. The second filtration device 16 is provided with an outlet 18. The outlet 18 of the second filtration device 16 is connected to a second inlet side of the valve mechanism 22.

The valve mechanism 22 is provided with an outlet conduit 24. The outlet conduit is connected to a blower mechanism 20, conveniently a fresh air blower.

The valve mechanism allows air flow from the second filtration device 16 to the outlet conduit 24 while isolating the first filtration device 12 or, alternatively allows air flow from the first filtration device 12 to the outlet conduit 24 while isolating the second filtration device 16.

The valve mechanism 22 may be operated by any convenient means, for example automatically following a suitable signal received from a suitable sensor, automatically following actuation of a suitable device for example a sprayer, or by the direct action of a driver actuating suitable means within the cab.

Figure 5:
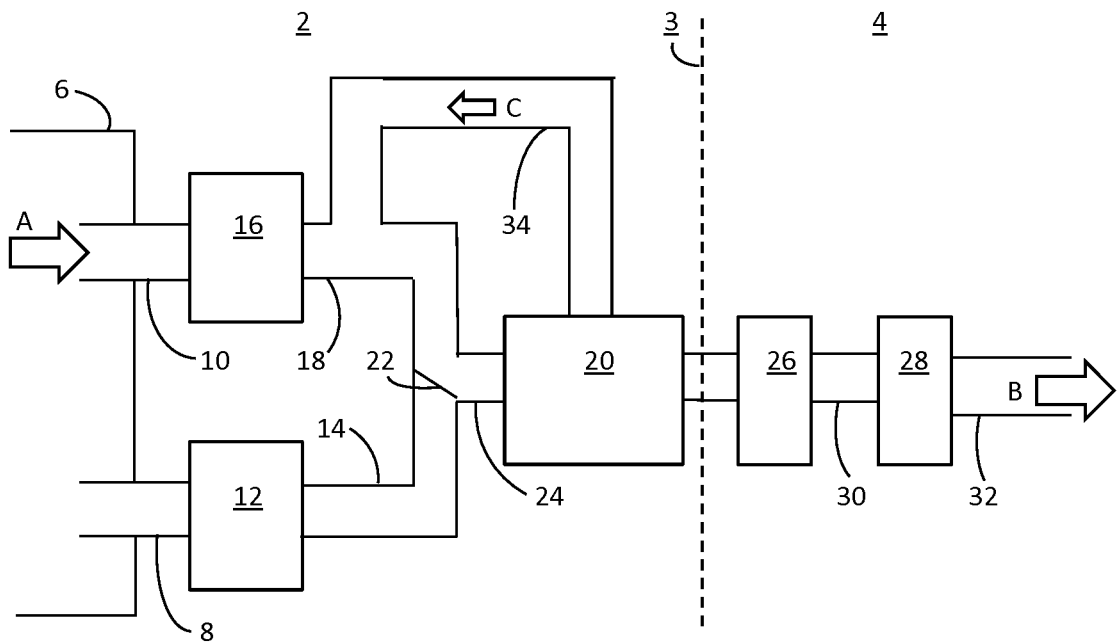
FIG. 5 shows a schematic view of a third embodiment of an air filtration apparatus in accordance with the present invention in a first operating condition.
Figure 6:
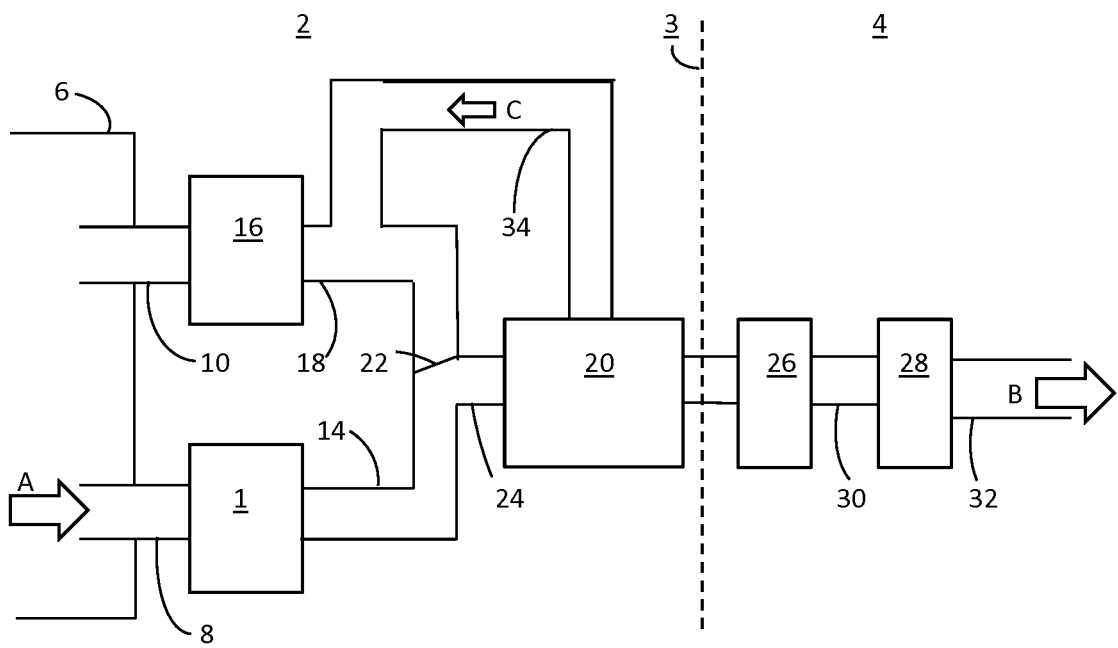
FIG. 6 shows a schematic view of the air filtration apparatus of FIG. 5 in a second operating condition.

In FIGS. 5 and 6, an outlet of the fresh air blower 20 is connected to an inlet plenum of the HVAC system and in particular connects the common outlet 24 to a blower 26 of the HVAC system ('HVAC system blower'). IN this embodiment also, the fresh air blower 20 is kept activated while air is being filtered.

The HVAC system typically includes additional components 28, such as by way of example a evaporator and a heater, downstream of the blower 26. The HVAC blower 26 is provided with a connecting conduit 30 to direct the air flow through the other components before delivery to the cabin by way of a cabin air supply duct 32.

A first end of a bypass channel or passage 34 is connected to the fresh air blower 20. A second end of the bypass channel or passage 34 is located between the second filtration device 16 and the valve mechanism 22.

A further air recirculation path is provided by a conduit (not shown) extending between the cabin and the outlet conduit 24.

The typical operating position of the valve mechanism 22 is that shown in FIG. 6. However, when there is a need to extract aerosols, vapour and the like the system is switched to the position shown in FIG. 5.

To adopt the configuration shown in FIG. 5, the valve mechanism 22 is moved to the position shown. Air is drawn into the air filtration system through the second vent or duct 10 (arrow A) and drawn through the second filtration device 16 to remove dust, aerosols, vapour and the like entrained in the air. The air is directed through the valve mechanism 22 to the outlet conduit 24 through the fresh air blower 20 and then drawn by the HVAC system blower 26 into the HVAC system and onward to the cabin air supply duct 32 (arrow B). In this position, the valve mechanism 22 prevents air flowing from the first filtration device 12 to the fresh air blower 20 or the HVAC blower 26.

Some of the air drawn into the HVAC system will recirculate through the bypass 34 (arrow C) to the region between the second filtration device 16 and the valve mechanism 22 to mix with the freshly filtered air from the second filtration device 16 before being drawn again by the fresh air blower 20 as described above.

Once the need to extract aerosols, vapour and the like has passed, the valve mechanism 22 is caused to adopt the position shown in FIG. 6. In this position, the valve mechanism 22 prevents air flowing from the second filtration device 16 past the fresh air blower 20 to the inlet plenum of the HVAC blower 26.

Air is drawn into the air filtration system through the first vent or duct 8 (arrow A) and directed through the first filtration device 12 to remove dust and the like entrained in the air. The air passes through the valve mechanism 22 to the outlet conduit 24 through the fresh air blower 20 and then drawn by the HVAC system blower 26 into the HVAC system and out through the cabin air supply duct 32 (arrow B).

However, a portion of the air drawn into the HVAC system is drawn through the bypass channel or passage 34 (arrow C) to the region between the second filtration unit 16 and the valve mechanism 22, where the recirculated air is directed back through the second filtration device 16, thereby removing trapped dust, vapour and aerosol particles and the like from the second filtration device 16 and directing these back out through vent or duct 10.

From reading the present disclosure, other modifications will be apparent to persons skilled in the art.

The invention claimed is:
1. An air treatment apparatus for an operator environment of an agricultural vehicle comprising:
   an HVAC system comprising:
      an inlet plenum;
      a blower; and
      an outlet to the operator environment,
   an air filtration system comprising:
      at least one external inlet;
      a first filtration device comprising a first coarser level of filtration located between the at least one external inlet and the HVAC inlet plenum;
      a second filtration device having a second finer level of filtration located between the at least one external inlet and the HVAC inlet plenum;
      an air filtration system blower connected to the HVAC inlet plenum;
      a valve mechanism configured to selectively connect either the first filtration device to the HVAC inlet plenum or the second filtration device to the HVAC inlet plenum, wherein the valve mechanism is located between the air filtration blower and the HVAC inlet plenum; and
      a bypass permanently connected at a first end downstream of the valve mechanism and at a second end adjacent the second filtration device and the valve mechanism, and configured such that when the first filtration device is connected with the HVAC system inlet plenum, a portion of air flow from the first filtration device downstream of the valve mechanism is recirculated through the bypass to purge the second filtration device.

2. The air treatment apparatus according to claim 1, wherein the second end of the bypass is located between the second filtration device and the valve mechanism.

3. The air treatment apparatus according to claim 1, wherein the valve mechanism selectively connects either the first filtration device to the HVAC inlet plenum or the second filtration device to the HVAC inlet plenum and is configured such that air flow is directed from the connected filtration device to the HVAC inlet plenum.

4. The air treatment apparatus of claim 1, wherein the valve mechanism is located between the first filtration device and the second filtration device.

5. The air treatment apparatus of claim 1, wherein the first filtration device is configured to filter dust particles.

6. The air treatment apparatus of claim 1, wherein the second filtration device is configured to filter dust, aerosols and vapour.

7. The air treatment apparatus of claim 1, wherein the air filtration blower is associated with the second filtration device, the second end of the bypass is located between the air filtration blower and the second filtration device, and a first end of the bypass is located between the HVAC blower and the operator environment.

8. The air treatment apparatus of claim 1, wherein the valve mechanism is located between the first filtration device and the air filtration blower which is associated with the second filtration device.

9. The air treatment apparatus of claim 1, wherein a first end of the bypass is located between the HVAC blower and the operator environment.

10. The air treatment apparatus of claim 1, wherein the air filtration blower is located between the valve mechanism and the HVAC inlet plenum.

11. An air treatment apparatus for an operator environment of an agricultural vehicle comprising:
    an HVAC system comprising:
        an inlet plenum;
        a blower; and
        an outlet to the operator environment,
    an air filtration system comprising:
        at least one external inlet;
        a first filtration device comprising a first coarser level of filtration located between the at least one external inlet and the HVAC inlet plenum;
        a second filtration device having a second finer level of filtration located between the at least one external inlet and the HVAC inlet plenum;
        an air filtration system blower connected to the HVAC inlet plenum;
        a valve mechanism configured to selectively connect either the first filtration device to the HVAC inlet plenum or the second filtration device to the HVAC inlet plenum;
    a bypass permanently connected at a first end downstream of the valve mechanism and at a second end adjacent the second filtration device and the valve mechanism, and configured such that when the first filtration device is connected with the HVAC system inlet plenum, a portion of air flow from the first filtration device downstream of the valve mechanism is recirculated through the bypass to purge the second filtration device; and
    wherein all the first end of the bypass is connected to the air filtration blower.

12. A method of operating the air treatment apparatus of claim 1, comprising:
    ensuring the HVAC blower is activated;
    selecting the first or the second filtration device to be connected;
    and either i) ensuring the blower associated with the second filtration device is inactive and connecting the first filtration device to the HVAC system to direct a portion of treated air out through the second filtration device or ii) actuating the blower associated with the second filtration device; and ensuring the second filtration device is connected to the HVAC system to direct a portion of treated air through the blower associated with the second filtration device.

13. A method of operating the air treatment apparatus of claim 1, comprising:
    ensuring both the air filtration system blower and the HVAC blower are activated; and
    selecting the first or the second filtration device to be connected, and configured such that either i) the first filtration device is connected to the HVAC system to direct a portion of treated air out through the second filtration device or ii) the second filtration device is connected to the HVAC system.

14. An agricultural vehicle comprising the operator environment, and the air treatment of claim 1.

15. The air treatment apparatus according to claim 11, wherein the second end of the bypass is located between the second filtration device and the valve mechanism.

16. The air treatment apparatus according to claim 11 wherein the valve mechanism selectively connects either the first filtration device to the HVAC inlet plenum or the second filtration device to the HVAC inlet plenum and is configured such that air flow is directed from the connected filtration device to the HVAC inlet plenum.

17. The air treatment apparatus of claim 11, wherein the valve mechanism is located between the first filtration device and the second filtration device.

18. The air treatment apparatus of claim 11, wherein the first filtration device is configured to filter dust particles.

19. The air treatment apparatus of claim 11, wherein the second filtration device is configured to filter dust, aerosols and vapour.

20. The air treatment apparatus of claim 11, wherein the air filtration blower is located between the valve mechanism and the HVAC inlet plenum.

* * * * *